ADJUSTABLE FREQUENCY COMMUTATOR GENERATOR

Filed July 23, 1947

6 Sheets-Sheet 1

INVENTOR:
HEINZ ROSENBERG
BY
[signature]
HIS ATTORNEY

Oct. 30, 1951 H. ROSENBERG 2,573,494

ADJUSTABLE FREQUENCY COMMUTATOR GENERATOR

Filed July 23, 1947 6 Sheets-Sheet 2

INVENTOR:
HEINZ ROSENBERG
BY E. J. Freeman
HIS ATTORNEY

INVENTOR:
HEINZ ROSENBERG
BY [signature]
his ATTORNEY

INVENTOR:
HEINZ ROSENBERG
BY E. G. Freeman
his ATTORNEY

INVENTOR
HEINZ ROSENBERG
By E. Freeman
ATTORNEY

INVENTOR
HEINZ ROSENBERG
By E. F. Wenderoth
ATTORNEY.

Patented Oct. 30, 1951

2,573,494

UNITED STATES PATENT OFFICE 2,573,494

ADJUSTABLE FREQUENCY COMMUTATOR GENERATOR

Heinz Rosenberg, Vienna, Austria

Application July 23, 1947, Serial No. 762,963
In Germany April 5, 1944

Section 1, Public Law 690, August 8, 1946
Patent expires April 5, 1964

24 Claims. (Cl. 171—252)

The invention relates to an electric commutator machine, especially to a generator for producing electric currents of variable frequency, e. g., for feeding vehicle drive motors, especially of the squirrel-cage asynchronous type, which owing to their higher safety of operation, which is due to their simple construction, and owing to their high efficiency, small space requirements and expense of material, as well as to their adaptability to given, especially confined space conditions, are particularly suitable for driving vehicles.

It has been proposed to generate polyphase-current having a substantially gradually changeable frequency by means of commutator machines comprising an additional rotor, especially an intermediate rotor coaxially arranged with respect to the stator and rotor. In these machines the intermediate rotor acts by the useful field which it produces upon the winding of the armature connected with the commutator, as well as upon the winding of the stator, and it generates in these windings, which are opposite series-connected, a tension, the frequency of which is proportional to the momentary existing number of revolutions of the intermediate rotor. In these machines, however, regulating of the number of revolutions of the intermediate rotor and therefore adjusting of the frequency too, was effected by the machine itself, and that by adjustable fields and turning moments acting upon the intermediate rotor and determining its number of revolutions, the said fields and turning moments were obtained by brush displacements, or by intentional changing of the current intensities in the winding of the armature or the stator, or by special currents flowing through separate auxiliary windings of the stator, or by providing a shunt-connected stator winding and changing the number of turns of the stator winding, or by combination of the above-named measures. These designs are subjected to the considerable impropriety that the said fields and turning moments are mostly dependent on the load and the voltage, and they are always only little changeable along with the frequency, provided that they are not adjusted, resulting in the number of revolutions of the intermediate rotor and therefore the produced frequency showing an unstable behaviour and depending on the load. Also the complicated connections necessitated by the said measures as well as the adjustment of the brushes during the working, and the switching over of the stator windings when the machine is loaded, all these facts represent considerable disadvantages, which, in connection with the unstableness of the frequency and its dependency on the load and the difficulties with regard to the commutating, prevent these machines from being practically used.

The object of this invention is to overcome the above-named difficulties by providing a machine in which the frequency is preferably gradually adjustable in such a way that the number of revolutions of the intermediate rotor is fully or partly determined by a separate drive adjustable in the same way. This object is achieved according to the invention by providing an electric commutator machine in which the stator winding is series connected in opposition to the armature winding and substantially arranged as the electromagnetical reflection of the latter, and which machine comprises a second rotor arranged between stator and armature and coaxial with them, and means for controlling the speed of said intermediate rotor.

In a preferred embodiment of the invention the stator winding is an evenly distributed slot winding for setting up a magnetic flux compensating the magnetic flux set up by the armature winding.

A suitable means for controlling the speed of said intermediate rotor is a synchronous motor, fed by the generator, for driving said rotor. This design results in a stable behaviour of the frequency as well as in obviating a direct dependency on the tension, the number of revolutions of the armature and the load conditions. The separate drive of the intermediate rotor also enables to avoid arising of particular turning moments exerted by the armature or the stator of the machine, resulting in a simplification of the machine and assisting in the aforementioned advantageous effect of the drive of the intermediate rotor according to this invention. This absence from turning moments is obtained by the mutual compensation of the total fluxes of armature and stator, offering at the same time favourable conditions for commutation.

Another feature of the invention consists in providing an auxiliary armature which is disposed outside the space filled up with the field of the intermediate rotor, and that between the commutator and the armature, the said auxiliary armature being wound in common with the other armature and surrounded by reversing poles excited in a special way, this feature in connection with the forementioned results in a reversal of current unobjectionable in all conditions of working.

In the accompanying drawings,

Fig. 1 is an axial section showing an embodiment of the commutator generator, in accordance with the invention.

Fig. 1$a$ is a cross section taken along the line I$a$—I$a$ of Fig. 1.

Fig. 2 is also a section taken along the line I$a$—I$a$ of Fig. 1 and shows the structure of the intermediate rotor on a larger scale.

Figs. 3$a$–3$e$ show the voltage vector diagrams of a single-phase generator.

Figs. 9$a$ and 9$c$ and 10$a$ and 10$c$ are wiring diagrams of the exciting windings of a synchronous motor for driving the intermediate rotor, said motor having two exciting windings, which are electrically displaced by 90 degrees and which in the first case (Figs. 9$a$–9$c$) are fed from a single source of direct current, the individual currents flowing through them being variable in any desired coordination from zero to the maximum of the current bearing capacity of the windings. In the second case (Figs. 10$a$–10$c$), the exciting windings are fed from two different sources of current, one of which is not regulated whereas the other is variable by means of a voltage divider from a positive to a negative maximum.

Figure 11:
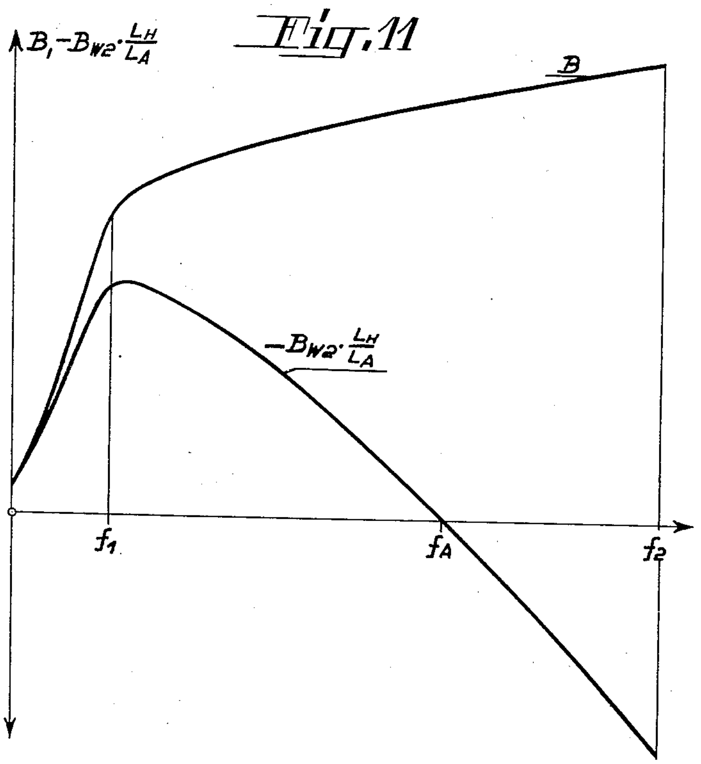

Fig. 11 shows, plotted against the frequency, the curve indicating the local induction of the useful field which influences the commutating coils and that of one component of the commutating field.

Figure 12:
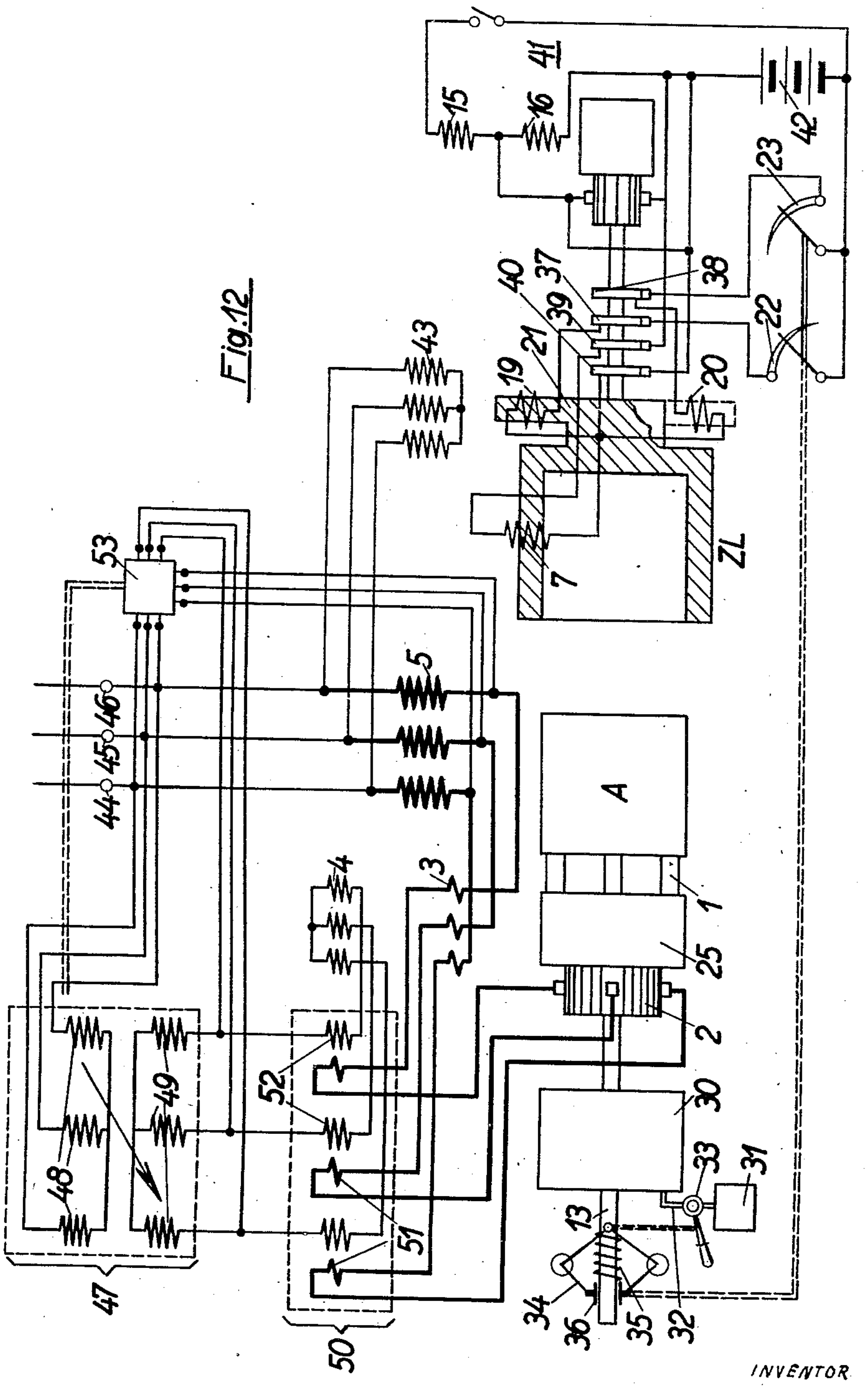

Fig. 12 shows the overall wiring diagram of a preferred embodiment of the electric commutator machine together with control means.

Figures 13, 14, 15, 16, 17, 18:
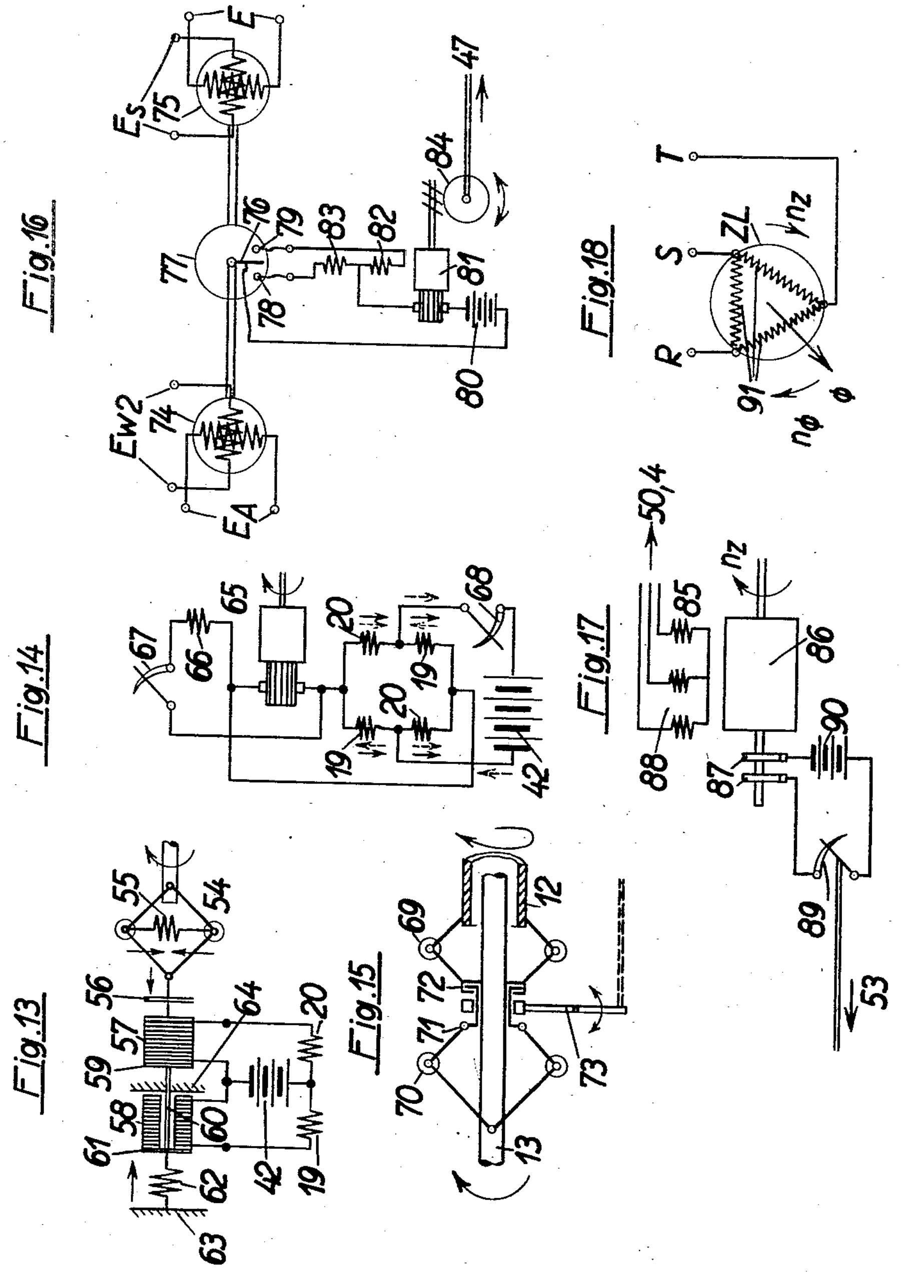

Fig. 13 shows a regulating device for the exciting windings of the synchronous motor for driving the intermediate rotor, in which device the exciting resistances, consisting of carbon rheostats, are varied directly under the influence of the centrifugal force exercised by a centrifugal regulator.

Fig. 14 shows a wiring diagram of a regulating device, in which the exciting windings of the synchronous motor for driving the intermediate rotor are fed by a D. C.-dynamo which is unstably self-exciting when running at a set speed, and by a separate D. C.-source.

Fig. 15 shows a mechanical device dependent in operation on the quotient of armature and intermediate-rotor speeds, for controlling the continuously-variable-ratio transformer or its equivalent for feeding the additional windings on the commutating poles.

Fig. 16 shows a device for regulating said continuously-variable-ratio transformer, said device comprising two cross-coil relays for comparing the quotient of the voltages of the additional commutating pole windings and the armature with that of the stator and total voltages.

Fig. 17 is a wiring diagram showing an exciter, which is controlled, e. g., by devices such as shown in Figs. 15 and 16, for feeding the additional commutating pole windings.

Fig. 18 is a wiring diagram showing the exciting winding of the intermediate rotor, said winding being fed with three-phase current of the exciter frequency.

I. The Fundamental Principle

Figure 1:
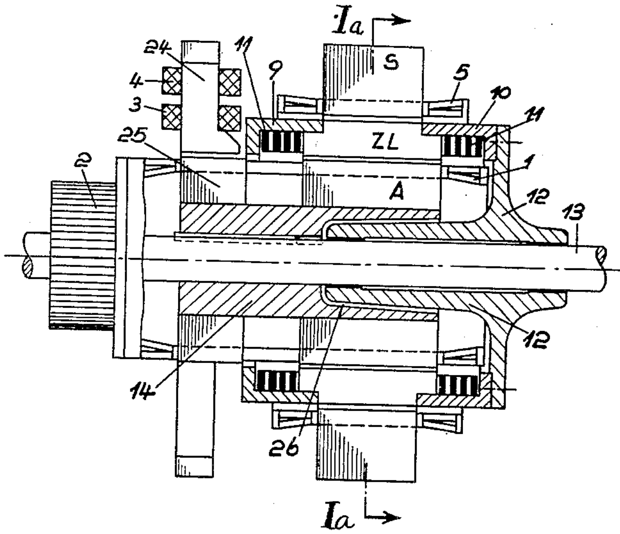
Figure 1A:
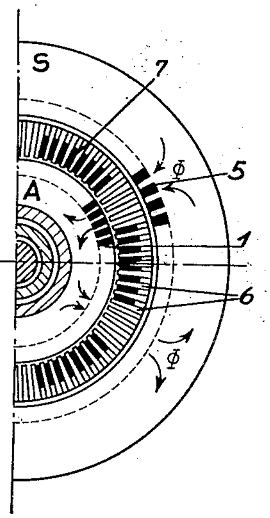

Figs. 1 and 1$a$ illustrate the essential parts of the generator for generating the current, namely the armature A, the stator S and the intermediate rotor ZL. (See also Fig. 12.)

The armature carries a closed-coil commutator winding (direct-current winding) 1 which is connected to a commutator 2. From that commutator current is collected by $m$ groups of brushes for each pair of poles, wherein $m$ means the number of phases of the machine. Usually $m$ is equal to 3 or 6. The brush currents are conducted through the $m$ separate phases of the winding of the stator S, then flowing through commutating pole windings 3 as well as the auxiliary apparatus serving for exciting the required reversing fields and thereupon they are conducted to the connected points of consumption. A commutating pole winding 4 is provided near the winding 3 for producing a reversing field $\Phi$ W2, as explained further below.

The winding 5 of the stator S is made and arranged in such a way that the total flux through the stator AW by the current supplied by the generator compensates at least substantially in every point of the circumference the total flux through the armature caused by the same current in the armature winding. The magnetic effects of the two windings compensate one another and therefore, when the machine is loaded there does not rise any significant armature field interlinked with the two windings, and thus no so-called armature reaction occurs. There are the same conditions as in case of the compensated direct-current machines, but one has to imagine the compensation extending over the whole circumference of the armature. Thus the stator winding 5 being an electromagnetical reflection of the armature winding 1 must also be a uniformly distributed slot winding.

The useful field $\Phi$ producing the electromotoric force of the machine is generated in every state of working only by the intermediate rotor ZL that is arranged between the armature and the stator. With a certain kind of reversing pole-connection of the exciting circuit the machine also generates auxiliary currents flowing in the armature or in the stator only, the total flux of which thus is not compensated, whereby they participate in generating the field $\Phi$. However that fact shall be disregarded here as it is not in connection with the fundamental principle of the machine. The active part of the intermediate rotor comprises (Figs. 1$a$ and 2), iron webs 6 magnetically insulated from one another, a distributed exciting winding 7 being arranged between them. The said winding is made in the same way as the exciting winding of a synchronous smooth-core generator (turbo-generator), namely about two thirds of each pole-pitch are wound. The winding 7 of the intermediate rotor is excited by continuous current and produces the useful field $\Phi$ which is distributed approximately sinusoidally. (On principle the intermediate rotor may also be excited with polyphase current of any frequency. A three-phase exciting winding 91 known per se is arranged on the intermediate rotor ZL (Fig. 18). This winding is fed with the exciting frequency $f_E$ from a three-phase source through the terminals R, S, T and through slip rings, which are not shown. The field $\Phi$ revolves at the speed $$\pm\frac{60 f_E}{p}$$

relative to the intermediate rotor and thus has the absolute speed $$u_\phi = n_z \pm \frac{60 f_E}{p}$$

This way of exciting the intermediate rotor, however, is restricted to special applications which are not dealt with here in more detail). The iron webs 6 of the intermediate rotor being magnetically insulated from one another, accordingly only a radial magnetical conductivity exists, the useful field Φ is enabled to close across the cores of the armature and the stator only, except for stray lines of force, thus penetrating the two slot tooth layers and accordingly is fully interlinked with the windings of the armature and stator.

Figure 2:
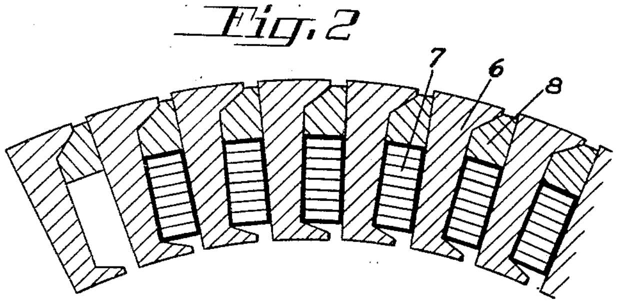

As shown in Fig. 2, between the iron webs 6 of the intermediate rotor there are wedges 8 of light metal or other non-magnetic material which wedges support the winding and at the same time serve as distance-pieces of the webs. As a matter of fact there may also be used open slots, instead of the partly closed slots as shown by Fig. 2. All these parts are tangentially pressed to one another by caps 9 and 10 of non-magnetic material preferably non-magnetic steel, which caps are shrunk on the two front surfaces effecting a good strength in the same way as in commutators, which strength is increased some more in the present case by the fact that transmission of force is not effected by way of yielding insulation material, but chiefly of metal parts only. Besides the caps 9 and 10 are used for supporting the front connection pieces 11 of the exciting winding 7. The cap 10 is fixed to the hub 12 of the intermediate rotor which hub is revolvably fitted to the shaft 13 of the armature A. For the purpose of stability the hub 12 of the intermediate rotor extends as far as possible into the recess 26 of the correspondingly bell shaped hub 14 of the armature.

In the perfect machine, that is the machine free of losses, the intermediate rotor keeps free from rotational moments, irrespective of the strength of the field Φ and the intensity and number of phases of the armature current. The rotational moment produced by the field Φ and being proportional to the product of field times total flux of the winding of the armature, is of the same value but of opposite direction as the rotational moment imparted by the field to the stator of the machine, since the total fluxes of armature and stator are equal in opposite directions. Therefore the two reaction rotational moments acting upon the generator of the field, that is upon the intermediate rotor compensate one another. One gets the same result by adding up the effects between the exciting ampere-turns per unit of length of the intermediate rotor and the two opposite equal (fictitious) partial fields which correspond to the total flux through the armature and the stator alone. In fact however the intermediate rotor is subjected to a rotational moment by the loss due its air and bearing friction as well as by the iron-losses effected in the armature and the stator by its field and in case that there are auxiliary currents flowing through armature and stator only, by the active component of these currents too, the said rotational moment amounting to about 0.5% up to 3% of the armature moment.

If $n_A$ denotes the number of revolutions of the armature and $n_Z$ the number of revolutions of the intermediate rotor and—if the intermediate rotor is D. C.-excited—that of the field Φ too (counted positively in the direction of $n_A$), the electromotoric force $E_A$ induced in the armature and being proportional to the field and to the relative velocity of the field with regard to the armature, answers the equation $$E_A=K_E.\Phi.(n_A-n_Z) \qquad (1)$$

wherein $K_E$ is a winding constant.. $E_A$ appears at the brushes having a frequency $f$ which, as already known, depends on the number of revolutions of the field with regard to the brushes only, thus $$f=\frac{p\cdot n_Z}{60} \qquad (2)$$

($p$ means number of pairs of poles of the machine). An electromotoric force $E_S$ is produced in the stator winding 5 which—in the same way as in the usual synchronous machines—is proportional to the product of the field times the velocity of the field with regard to the stator and likewise shows a frequency according to the Equation 2. The winding constant of the stator winding is the same as that of the armature winding, as it occurs in any case in windings which show the same flux in case of the same current. Thus $$E_S=K_E.\Phi.n_Z \qquad (3)$$

The electromotive forces $E_A$ and $E_S$ are (if $n_A-n_Z>O$) opposite to each other with regard to the windings in which they arise, as the two windings are crossed by the lines of force of the field in opposite directions. However as the armature winding and stator winding are connected in series, in opposite directions corresponding to the compensations of their fluxes, there is obtained a total electromotoric force as the sum of the partial electromotoric forces according to the Equations 1 and 3 and therefore amounts to:

$$E=K_E.\Phi.n_A \qquad (4)$$

As the Equations 2 and 4 show, the frequency $f$ of the generated current is completely independent from the voltage of the machine and from the number of revolutions of the armature. While the generated electromotoric force E is influenced by the field and by the number of revolutions of the armature only, the frequency depends only on the number $n_Z$ of the revolutions of the intermediate rotor. As the total flux of the supplied current is fully compensated, self-exciting by any undesired frequency is not possible in this generator, in contrast to other commutator machines.

Figs. 3a–3e show the voltage vector diagrams of a single phase generator in various states of working: (practically the single phase machine is not important but it suits the purpose of explaining the manner of working, as there is no phase displacement between the components of currents or voltage to be considered. As any poly-phase system may be divided into single-phase partial systems in any state of load, it is evident that the results are valid for poly-phase machines too). The conditions encountered in practical operation are explained hereafter more fully with reference to the vector diagrams of Figs. 3a–3e.

Figure 3A:
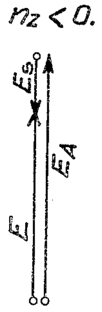

*Fig. 3a.*—Counter-running of Φ (opposite to the armature), therefore $n_Z<O$. The electromotoric force $E_A$ of the armature is superior to the total force E, it is decreased by the stator force $E_S$ down to E.

Figure 3B:

*Fig. 3b.*—Stoppage of the intermediate rotor and therefore of the field too. The total electromotoric force E is generated in the armature, $E_S=O$. The generator works as a compensated direct current machine.

Figure 3C:
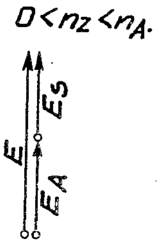

*Fig. 3c.*—Hypo-synchronism of the field, that means the intermediate rotor revolves in the same direction as the armature, but slower than the latter. $E_A$ and $E_S$ act in the same direction, each of these electromotoric forces is inferior to E.

Figure 3D:
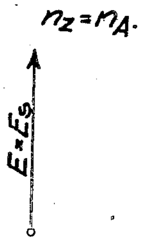

*Fig. 3d.*—Synchronism of the field. The intermediate rotor is in synchronism with the armature, $n_Z=n_A$, thus $E_A=O$, the total electromotoric force E is generated in the stator, the generator works as a synchronous machine, if the compensation of the armature reaction is disregarded.

Figure 3E:
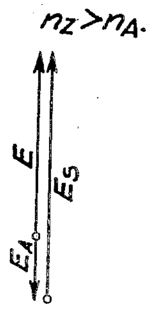

*Fig. 3e.*—Hypersynchronism of the field. The intermediate rotor revolves faster than the armature. Now the electromotoric force of the armature has inverted its direction with regard to the hypo-synchronous working, and counteracts the electromotoric force of the stator $E_S>E$.

Introducing the armature frequency $f_A$ according to:

$$f_A=\frac{p \cdot n_A}{60} \quad (5)$$

from the Equations 1, 3 and 4 results:

$$E_A=E.\left(1-\frac{f}{f_A}\right) \quad (6)$$

and $$E_S=E.\frac{f}{f_A} \quad (7)$$

Figure 4:
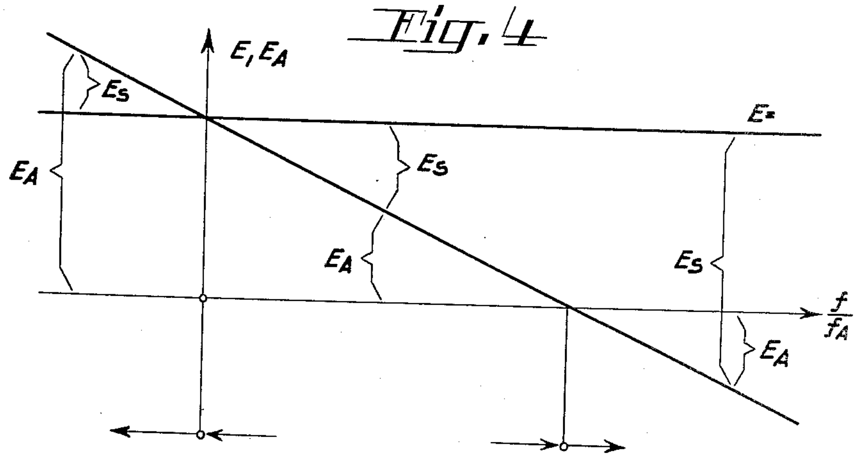
Figs. 4 to 6 show voltage-frequency characteristics for illustrating the mode of operation of the machine.

Fig. 4 illustrates the course of $E_A$ and $E_S$ with regard to the amount $f/f_A$ characterizing the state of working, if E is constant.

It may be added that the here-described machine may also be used as a motor.

II. CHARACTERISTICS OF TENSION AND EXCITING

Figures 5, 6:
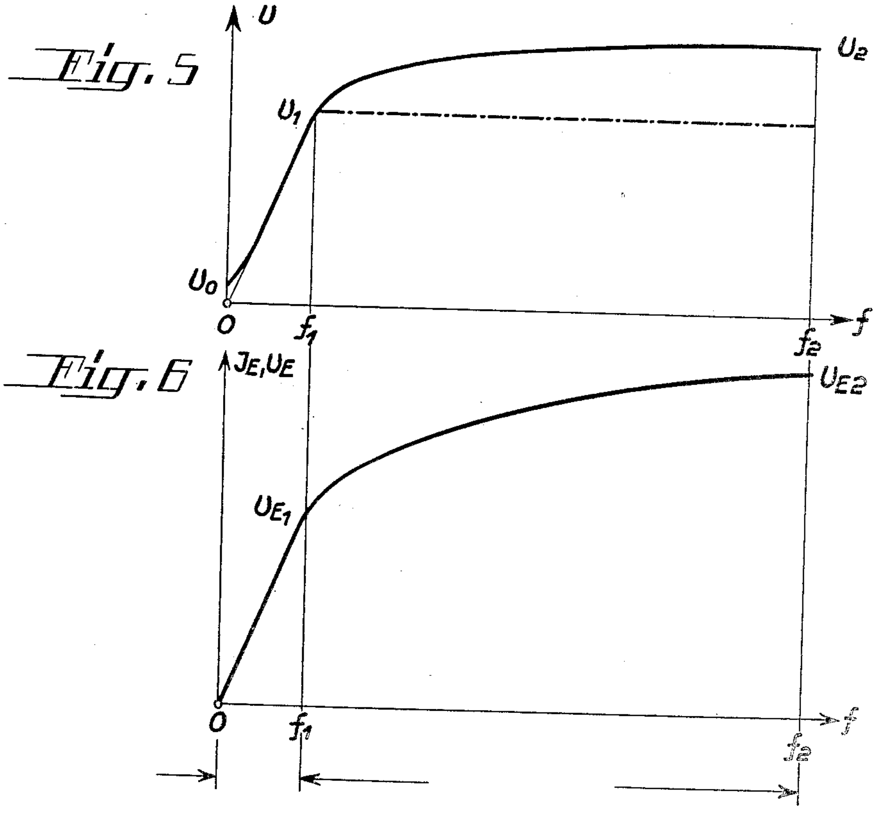

As already explained the voltage produced by the generator is primarily independent of the frequency. However with regard to the working conditions of the asynchronous or synchronous motors fed by the generator and those conditions depending on the frequency, it is necessary to keep a positively fixed relation of the voltage to the frequency which is illustrated in Fig. 5. In the lower range of the frequency (starting range) the connected motors shall get such a voltage that they act with the full nominal value of their intensities of field, in order to enable them to furnish the required momenta of rotation without too much consumption of current and without the risk of pull-out. By this, the proportionality of frequency relative to voltage is involved, from which we may depart only in the case of very low frequencies (the frequency $f=0$ corresponds to the initial voltage $U=U_0$) as the action of ohmic resistance of the supply main and the motor windings is perceptible, as compared with that of the inductive resistance of the said windings. Upwards from the frequency $f_1$ which is the parting line between starting range and the working range, the motors are able to absorb the full nominal output of the generator without the risk of any overloading. The best conditions for the generator would be obtained if the terminal voltage U were constant and were independent from the frequency (dotted line) in the whole range where the full power is involved. As already known a machine for constant power is best utilized if it delivers that power with a constant voltage and therefore constant current, too. (Variations of power factor shall be disregarded for the sake of simplification.)

In the present case it is generally not possible to keep the voltage constant in the whole working range, since the corresponding weakening of the fields of the motors—the fields would run inversely proportional to the frequency—would cause the risk of pull-out in the range of higher frequencies (revolution numbers of the motor). Thus the terminal voltage U of the generator must increase in connection with the frequency in the working range too, though to a considerably smaller extent than in the starting range. If the voltage corresponding to the limits of the frequencies $f_1$ and $f_2$ of the working range are called $U_1$ and $U_2$, the required ratio of the voltages amounts to about $U_2/U_1=1.2$ up to 2.0 according to the ratio of the frequencies $f_2/f_1$ and to the pull-out ratio of the motors (which ratio shall be as great as possible; the so-called starting qualities of the motors for the improvement of which the pull-out ratio is often decreased, are of no significance in working with gradually variable frequency).

As Fig. 5 illustrates the terminal tension shall have its course above the frequency like the no-load characteristic of a direct current machine. By taking into account the ohmic and inductive voltage drop of the machine, the required electromotoric force E of the generator results in the known manner from the terminal voltage, running above the frequency in a similar way as the terminal voltage. Since the electromotoric force E (provided that the number of revolutions of the armature is kept constant) according to Equation 4 is proportional to the field Φ, the diagram curve of the exciting current $I_E$ and the exciting voltage $U_E$ of the intermediate rotor as illustrated by Fig. 6 is obtained from that E-over-$f$-curve and the magnetisation characteristic of the machine, the said curve having its course above the frequency. The exciting voltage $U_E$ in the starting range runs proportional to the frequency (the remanent magnetism of the intermediate rotor—as a rule—is sufficient for the starting voltage $U_0$ of the generator with $f=0$ according to Fig. 5 or the corresponding starting electromotoric force $E_0$) and continues to ascend with decreasing inclination in the working range (the said inclination being greater than that of the U-curve according to Fig. 5 due to the saturation).

Figures 7, 8, 9A, 9B, 9C:
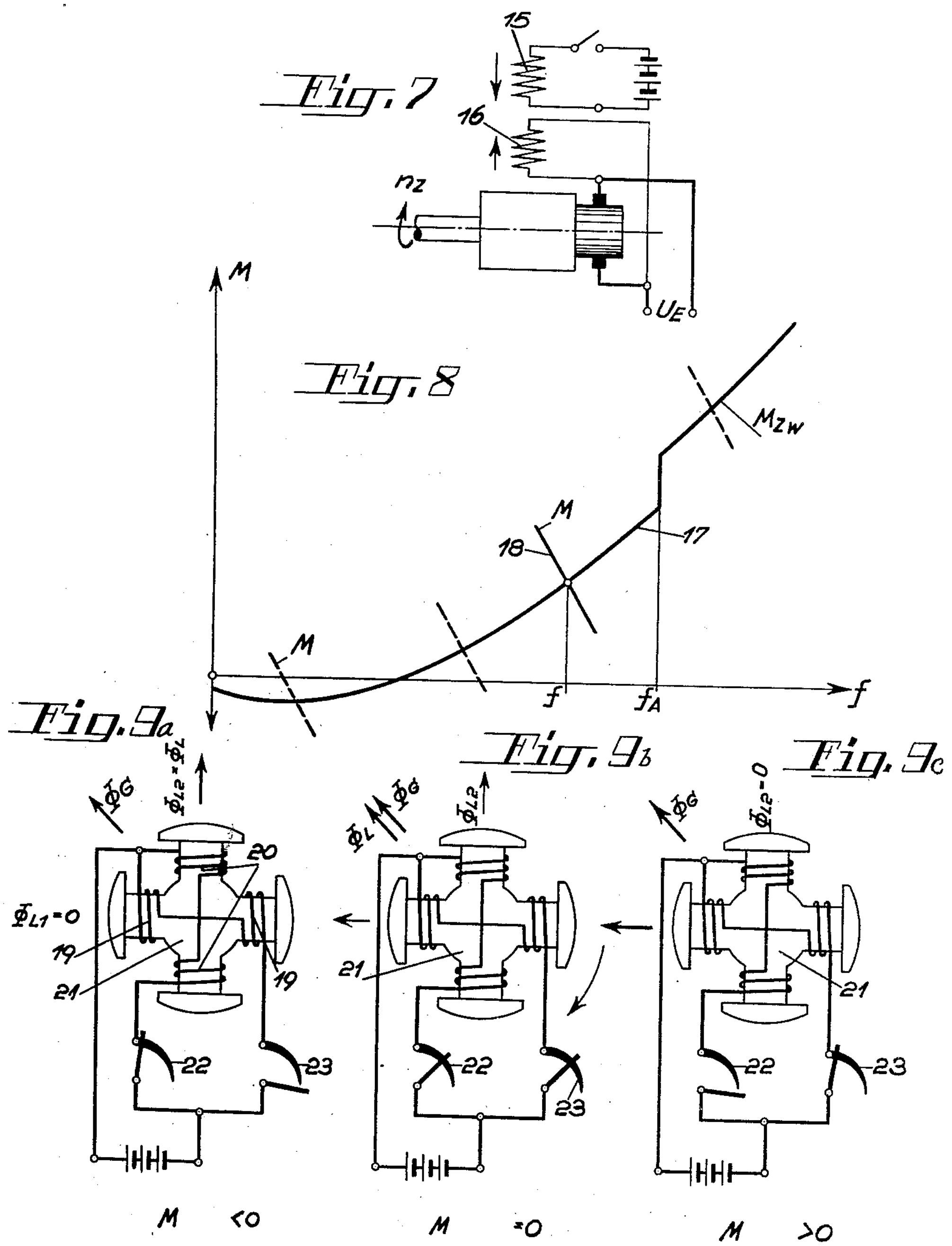
Fig. 7 shows a wiring diagram of an exciter for the intermediate rotor.
Fig. 8 shows the torque-frequency characteristics of the intermediate rotor.

The characteristics of the exciting voltage running above the frequency as illustrated by Fig. 6 may be obtained by arbitrary regulation as well as positively and automatically in multiple ways. It is especially easy and suitable to generate the exciting voltage $U_E$ by an exciter (Fig. 7 and Num. 41, Fig. 12) operated with a number of revolutions which is proportional to the frequency $f$—in the best way by coupling to the intermediate rotor ZL (Fig. 12)—and working with two exciting windings 15, 16 connected in opposition (differential exciting). The voltage of the exciter 41 (Fig. 12), which is mounted on the same shaft as to motor 21 for driving the intermediate rotor, is fed through slip rings 39, 40 to the exciting winding 7 of the intermediate rotor ZL. First of all the field of the exciter is generated with a high degree of saturation by fundamental exciting winding 15 fed by a constant supplied voltage (storage battery 42, Fig. 12, lighting dynamo) to which is opposed a second exciting winding 16 connected to the generated voltage $U_E$ or fed by the current $I_E$ being proportional to $U_E$ as illustrated in Figs. 7 and 12. The course of $U_E$ above the number of revolutions of the exciter and therefore also above the frequency $f$ is as follows: At the beginning, only the fundamental exciting works and produces a constant highly saturated field, resulting in a voltage $U_E$ being proportional to the number of revolutions, and accordingly to the frequency, as it is needed for the starting range (Fig. 6). The opposite exciting that is proportional to $U_E$, is practically not effective in the saturation range of the exciter field; it weakens the field only slightly due to the high saturation degree of the same. However, beginning with the voltage $U_{E1}$, that is from that point where the field has become non-saturated by the opposite exciting, the field decreases more and more corresponding to the increasing of the voltage and accelerated number of revolutions (frequency). Therefore in the working range, $U_E$ does not any longer increase proportionally to the frequency, but only in a lower degree and with decreasing inclination, asymptotically approaching a limit $U_{E\,\infty}$, corresponding to an infinite number of revolutions. By these means the exciting tension frequency characteristics of the generator is positively obtained avoiding relays, regulators, switch contacts and so on. It may be pointed out that the aforementioned saturation of the exciter field is not necessarily applied exclusively, or at least not only to the slot-tooth layer of the exciter armature, but is also possible in the known manner to be obtained or assisted by an adequate performing of the stator of the said machine (Dimensioning of the area of pole- and yoke-sectional areas use of the so-called isthmus-arrangements, and so on.) It is possible by these means to extend the initial saturation of the field at will and to influence the field diagram in its slightly saturated or non-saturated part to a far extent—the shape of the curves $U_E$ and E above $f$ in the working range of the generator depends, in turn, on that diagram and this is obtained without any inadmissible increase of the iron-losses and additional winding losses.

It should be mentioned that in some cases the two exciting windings 15, 16 may be completely or partly combined to a multiple fed winding, in order to save winding material and to reduce the space required.

III. Drive of the Intermediate Rotor, Regulating of Frequency and Output

The drive of the intermediate rotor determines the frequency produced by the generator. Since the driving power as already mentioned, amounts to a small fraction of the generator output only, friction gearing may be practical for a continuous regulation of the number of revolutions of the intermediate rotor (gradual regulation of frequency) up to the middle output of the generator (about 200 kva.), and beyond that hydraulic transmission, which are generally to be driven by the power engine driving the generator. The simplest and most reliable driving of the intermediate rotor however, which suits all ranges of the generator output to the same extent, is an electric drive powered by a synchronous motor fed by the generator itself and described as follows:

If the synchronous motor 21 is directly coupled to the intermediate rotor ZL (the usual way, Fig. 12) and provided with the same number of pole pairs as the generator, its number of revolutions at any frequency is equal to the number of revolutions of the intermediate rotor, which number is required to produce the adequate frequency according to Equation 2. (From Equation 2 can not only be seen the connection of generator frequency with the number of revolutions of the intermediate rotor but also the relation of the frequency to the number of revolutions of synchronous machines in general.) Thus there exists an indifferent equilibrium of the number of revolutions at any frequency. Therefore the intermediate rotor and the synchronous motor to be driven will arrive at that number of revolutions (generator frequency), at which there exists equilibrium of the adsorbed and the delivered rotational momentum. The driving momentum for the intermediate rotor and for the exciting machine coupled to it increases with the number of revolutions, since the air-friction losses and bearing friction losses as well as the iron losses and the exciter output increase with increasing frequency. In order to obtain stable working at the desired frequency, the rotational momentum furnished by the motor must be equal to the driving momentum corresponding to that frequency, but must change rapidly with that frequency in the opposite direction in order to effect a stable equilibrium at that desired value of the frequency. Fig. 8 illustrates the course of the driving momentum A7 of the intermediate rotor (including the exciter) above the frequency as well as the characteristics of the moments required for the desired values of the frequency existing at any time. With smaller frequencies the momentum to be imparted to the intermediate rotor is negative, therefore the motor has to be braked, as in this case the iron losses momentum controls, that is transmitted from the armature and which acts to accelerate the hypo-synchronism. Attention must be paid to the fact that in the present case the peculiarities of the synchronous motor are very different from those of a motor connected to a network having a predetermined fixed frequency. Such a fixed frequency motor works like a coupling resilient with regard to the rotation movement if the load moment of the motor changes, as the position of its rotor adequately changes relative to the synchronously rotating co-ordinate system determined by the vector of the voltage of the system. This, however, does not apply to the driving motor, since the vector of the feeding generating voltage leads or lags in the same degree, with the leading or the lagging of its rotor with respect to the hitherto existing "synchronous position," because the position depends only on the intermediate rotor of the generator coupled to the motor. Therefore the "synchronous motor" is by no means bound to a fixed synchronism; on the contrary the aforementioned "indifferent equilibrium" exists as a result of the uninterrupted cycle of cause and result, as, in turn, the frequency determining the number of motor revolutions is determined itself by that number of revolutions.

In order to obtain the frequency dependency upon the momentum delivered by the motor as illustrated in Fig. 8, the position of the motor field excited by direct current relative to the motor winding connected to the generator voltage must be variable in a steep frequency dependency. This fact involves e. g. a variability of the position of the field excited by direct current relative to that part of the motor which produces the said field. In the following, the position of the motor exciting is presumed to be in the rotor of the motor as usual. However the working conditions may be transferred without difficulty also to a motor having the exciting in the stator and the induced winding in the rotor. The displacement of the field of the motor rotor excited by continuous current relative to that rotor is enabled in a simple way by providing two exciting windings which are electrically displaced for a one-half pole-pitch, that is for 90°. Therefore as illustrated in Figs. 9*a*–9*c* concerning the synchronous motor which is bipolar with regard to the stator winding, the whole field $\Phi_L$ produced by the motor rotor is equal to the vector sum of the two components $\Phi_{L1}$ and $\Phi_{L2}$, arranged to each other at right angle and following the rotor with respect to their positions. Therefore $\Phi_L$ may be changed by an adequate controlling of the two excitings not only regarding its value but also regarding its position with respect to the rotor. The extent within which the axis of the field $\Phi_2$ can be displaced amounts to 90° electrically. If the middle position of the field axis corresponds to the working of the motor without any momentum—the axis of the rotor field and that of the total field $\Phi_G$ determined by generator voltage coincide in that case—driving moments of the motor as well as braking movements may be obtained by an adequate staggering of $\Phi_L$ with respect to the total field $\Phi_G$. There is no difficulty in the practical performance of such motors, as the utilizing of the machine is but of small significance at these low outputs. The simplest way is as Figs. 9*a*–9*c* and 12 show to provide the motor 21 with salient poles of double a number compared with that of the poles of the stator winding and being staggered by a one pole-pitch as indicated by dash lines in Fig. 12 at winding 20. By an adequate shaping of the pole shoes, bevelling of the slots and chording of the stator winding, the higher harmonics of the induced voltage are suppressed to a sufficient extent. Instead of the salient poles with separate exciting windings, it is also possible to provide the rotor 21 with slots and a distributed exciting winding, which is tapped or split at two points in a distance of 90° electrically, whereby also two excitings systems are obtained.

In the arrangement according to Figs. 9*a*–9*c* and 12 the two winding systems 19, 20 are fed by the same source of current 42 for the sake of simplification, the total-flux and with it the field components $\Phi_{L1}$ and $\Phi_{L2}$ being variable from zero to a maximum value by the resistances 22 and 23, by which means the previously explained regulation of the value and position of $\Phi_L$ is obtained.

Figures 10A, 10B, 10C:
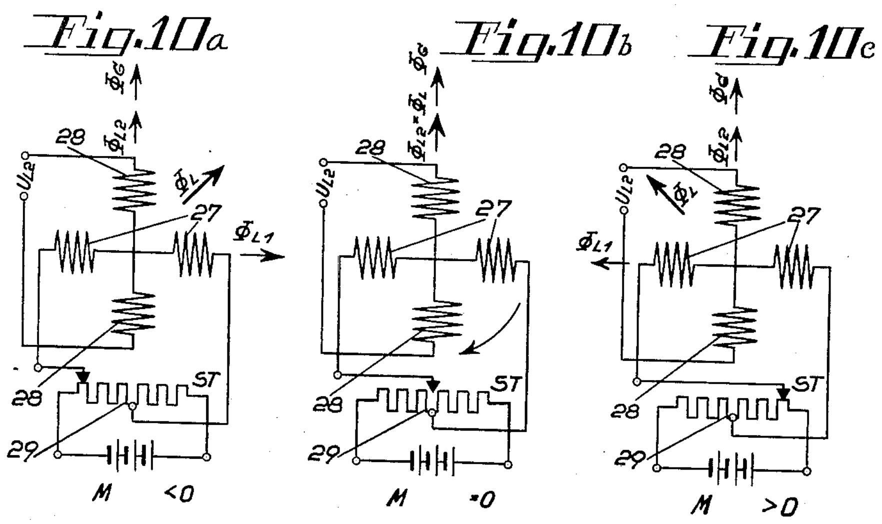

Figs. 10*a*–10*c* illustrate another electric connection by way of example. The exciting winding 27 generating the component $\Phi_{L2}$ is connected to a voltage subdivider 29 by which means the field $\Phi_{L1}$ is enabled to be adjusted within the extent from a positive maximum value to a negative one. The exciting winding 28 generating the field $\Phi_{L2}$ is connected to a voltage $U_{L2}$ generally being not adjusted and being supplied by the same source of current or of another one. (For instance $U_{L2}$ may be supplied from the exciter of the generator.) If the windings or the poles are arranged as Figs. 10*a*–10*c* indicate in such a way that the component $\Phi_{L2}$ coincides with the direction of the total field $\Phi_G$ determined by the vector of the generator voltage, the rotational momentum of the motor with respect to value and direction is determined by $\Phi_{L1}$ only, that is, by the voltage taken from the voltage divider 29, whereas $\Phi_{L2}$ acts only on the reactance output consumed or delivered by the motor. By the possibility to deliver a reactance output (of course existing also with the connection according to Figs. 9*a*–9*c*) the driving motor of the intermediate rotor is enabled to be used for relieving the generator from wattless current.

1. *Regulating of frequency*

If the generator shall supply a frequency adjustable at will, but primarily independent from the load, for instance keeping constant, this is obtainable in a simple way by a centrifugal regulator driven with the number of revolutions of the intermediate rotor, which regulator is adapted to the desired value of that number of revolutions (desired value of the frequency) and—if slight deviations from the desired value occur—changes the exciting resistances 22 and 23 (Figs. 9*a*–9*c* and 12) or the tension taken from tension subdivider 29 (Figs. 10*a*–10*c*) in such a way that the rotational momentum of the motor rapidly changes with the corresponding adjustment of the axis of the rotor field with respect to the rotor of the motor, the change happens in such a way that the deviations of number of revolutions (frequency) are not allowed to increase any more. As a matter of fact the adaptation of the centrifugal regulator to the desired value and by that the desired value of the frequency is able to be brought into dependency upon the working conditions of the generator (number of armature revolutions, rotational momentum, output and so on) or of the fed motors or of other machines, and therefore any desired adaptation of the values of frequency to the respective working conditions is obtainable.

2. *Adaptation of frequency and regulation of output*

Adjusting of the frequency to keep at a constant value and independent from the load (as explained in paragraph 1) is of course of an inferior significance only and has been set forth only to facilitate comprehension of the following.

If the generator is driven by a power engine whose speed varies in the inverse sense as its load (30, Fig. 12), e. g., by an internal combustion engine, and if the centrifugal regulator 34 (Fig. 12) controlling the moment of the driving motor of the intermediate rotor is driven with the same number of revolutions as the armature, but not with the same number of revolutions as the intermediate rotor, in that case the frequency is not kept at a constant value, but is adjusted to reach such a value that the number of revolutions of the generator armature practically maintains the desired value determined by the centrifugal regulator. In this way regulation of the output is obtained in an easy way by adjustment of the frequency. This is valuable for vehicles above all, as herein the automatic adaptation of the speed of the vehicle to the momentarily required driving force while keeping the driving engine output and its number of revolutions constant after having been adjusted at will, is most desirable (automatic adaptation to the terrain).

If the vehicle motors (asynchronous motors), which are not shown, are fed by the above described generator the said adaptation to the terrain is obtained by a centrifugal regulator 34 (Fig. 12) propelled at the number of armature revolutions (number of revolutions of the power engine) which regulator operates the exciting resistances 22 and 23 of the motor 19, 20, 21 driving the intermediate rotor (Figs. 9a–9c) or the voltage divider 29 (Figs. 10a–10c) of the exciting voltage, when deviations from the desired value of the number of revolutions occur, in such a way that for even a slight increasing (decreasing) of the number of power engine revolutions there occurs a considerable increasing (decreasing) of the produced frequency and in connection with it, also of the speed of the vehicle bound to that frequency. The desired output is manually controlled by supply 31, 32, 33 of driving fluid, the power engine 30 being not provided with a special regulator for the number of working revolutions (except the ultimate regulation for no-load and for maximum number of revolutions), in order not to diminuish its characteristics of varying its speed in the inverse sense as its load. The adaptation to the terrain is effected in the following manner: If there is—starting from a state of balance—an increasing (decreasing) of the driving resistance (required driving power), it involves an increasing (decreasing) of the output, as the frequency and therefore also the driving speed practically continue to be constant (apart from the slight variations of slip of the asynchronous motors). The rate of fuel supply to the power engine 30 remaining constant, the speed of the power engine and thus of the armature is reduced (increased), this change of speed resulting by means of the centrifugal governor 34, 35, which is mounted on the armature shaft 13 and whose sleeve 36 controls the exciting resistances 22, 23 of the motor 19, 20, 21 for driving the intermediate rotor, in such a reduction (increase) of the frequency and thus of the driving speed of the vehicle that the variation in output does not increase further. Thereby also the deviation of the number of power engine revolutions from its desired value does not increase any more. As the variations of the frequency above the desired value of the number of armature revolutions, as already mentioned, have a very steeply ascending characteristic, the said deviations remain very small in the largest range of the driving speed, and therefore also the output delivered by the power engine 30 practically remains constant, or depends only on the supply of driving fluid. If the supply of driving fluid—starting from the state of balance—is increased (decreased) that is the desired value of the power engine output correspondingly changed, then the number of power engine revolutions increases (decrease) as the generator at that time still delivers the hitherto existing output, causing even in case of a slight changing of number of revolutions such an increase (decrease) of the produced frequency and with it also of the driving speed, that by this means the balance of output is restored.

As already known it is not advantageous if internal combustion engine work with a constant number of revolutions in the whole working range; on the contrary it is desirable to adapt the number of revolutions to the different values of output, so that the number of revolutions increases along with the output. This is easy to obtain in the present case by a suitable connection, indicated in Fig. 12 by dash double lines, of the member 33 for controlling the fuel supply 31, 32, e. g., a throttle hand lever, to the setting of the tension of the spring 35 of the centrifugal regulator 34 changing the adjustment of the desired value of the regulator according to the desired relation.

The above explained regulation of the output (adaptation to the terrain) may also be effected by the disposition (described in paragraph 1), that is with a centrifugal regulator propelled at the number of revolutions of the intermediate rotor, as by these means, as already mentioned, any problem of regulation may readily be solved. In that case the adjustment of the regulator to the desired value and by it of the frequency controlled by the regulator must be influenced by a power relay controlling the output of the generator (power of the driving engine) in a steeply ascending dependency upon the deviations of the desired value of that output. In that case an indirect regulation of the output exists as the power relay controls the centrifugal regulator, but the latter controls the frequency to the required extent to maintain the output. On the other hand if the controlling of the output is effected by the centrifugal regulator 34, 35, 36 (Fig. 12) itself, as above explained, the regulation of output is a direct one. The direct regulation of course is simpler than the indirect one and therefore is to be preferred where its application is enabled by a generator propelled with a suitable resilience with regard to the number of revolutions. However, in case of propelling the generator by a practically constant number of revolutions (for instance by a shunt motor, an asynchronous or a synchronous motor) one has to resort to the indirect controlling of the power. That is the case in locomotives with converter if they are supplied with power by means of single phase current from an overhead conductor and transformation into poly-phase current having variable frequency is effected in the way of a synchronous or asynchronous motor propelling the intermediate rotor-generator.

3. *Structure of the centrifugal regulator and of the exciting resistances*

Generally the exciting resistances 22 and 23 (Figs. 9 and 12) are to consume small power only and are therefore preferably carbon pressure rheostats 57, 58 (Fig. 13) connected to the centrifugal regulator 54, 55 and directly operated by its exertion of force in such a way that according to the direction of deviation of the number of revolution one of said rheostats is charged with a higher pressure and the other one in return is relieved, or vice versa. The centrifugal regulator 54, which is driven at the speed of the armature or of the intermediate rotor and which comprises the regulating spring 55, transmits its axial force through its end bearing 56 to the carbon rheostat 57, whose movable thrust plate 59 bears by means of a bolt 60, which is passed through the carbon rheostat 58, on to the movable thrust plate 61 of the latter. The latter thrust plate is subject to the counteracting forces of said bolt and of a compression spring 62, which has a fixed abutment at 63. The rheostat 58 rests on the fixed abutment 64. The carbon rheostats 57, 58 are connected in the circuits of the exciting windings 19, 20, respectively, of the synchronous motor for driving the intermediate rotor, which windings are fed from a common D. C.-source 42. The rheostats take the place of the resistances 22 and 23 shown in Figs. 9 and 12.

When the speed is increased the compressive force exercised by the regulator 54 on the rheostat 57 is reduced, whose resistance is thus increased, whereas the difference between the force of the spring 62 and the force of the regulator transmitted by the bolt 60 now increases, the resistance of the rheostat 58, which is subject to that difference, thus decreasing. The operation of the voltage subdivider 29 (Fig. 10) may be effected in the same way by carbon pressure rheostats. That embodiment offers various advantages: On one hand the changing of the resistance and of the tension is a gradual one, and switch contacts being exposed to wear and breakdown are avoided. On the other hand the structure of the centrifugal regulator is very simple and and reliable, as in contrast to the usual regulators it does not work by shifting bars, or the like, but is directly operated by the centrifugal force itself, while the regulator deflection is insignificantly small according to the elastic deformation of the carbon pressure rheostat. Accordingly also the problems of stabilisation connected with the usual regulators do not occur here, which stabilisation precautions often render it difficult to adjust the desired value of number of revolutions within a wider range. The desired value of number of revolutions can be influenced to any desired extent by the tension of a spring counteracting the centrifugal force (the power difference of centrifugal force and spring tension acting upon the rheostats).

It is also to be mentioned that centrifugal regulators and exciting rheostats or voltage subdivider may be replaced by a small self-exciting direct current dynamo 65 (Fig. 14), being momentarily in the unstable (non-saturated) state of equilibrium when the desired value of number of revolutions is reached, so that slight deviations of the number of revolutions effect great variations of the produced voltage. If that voltage together with another direct current voltage, e. g., of the battery 42, act upon the exciting windings 19, 20 of the driving motor 21 of the intermediate rotor ZL, the same steep dependency of the motor moment upon the deviations of number of revolutions of the unstable regulating dynamo 65 is effected, as the dependency obtainable by above explained dispositions (Fig. 13) by means of centrifugal regulator and exciting resistances. The use of such a regulating dynamo is recommendable first of all in case of a very great output of the generator, where also the exciter capacities of the driving motor of the intermediate rotor are in position to reach greater values. In Fig. 14, numeral 65 refers to the unstably-self-exciting D. C. dynamo driven at the armature or intermediate rotor speed. Preconnected to its exciting winding 66 is a regulating resistor 67, which permits of setting and adjusting the speed at which the dynamo is unstably self-exciting, i. e., the set speed. The exciting windings 19, 20 of the synchronous motor 21 (Fig. 9) for driving the intermediate rotor, which windings are electrically displaced by 90 degrees, are so connected that they alternate in forming the branches of a bridge network, to which is applied on the one hand the voltage of the battery 42, which supplies the fundamental exciting current, which is adjustable by means of a rheostat 68 (dash arrows), and on the other hand the terminal voltage of the unstably-self-exciting D. C. dynamo 65 (solid arrows). If the speed varies from its set value, the currents flowing through the exciting windings 19, 20 of the synchronous motor for driving the intermediate rotor are varied in the counteracting sense. That regulation of the number of revolutions by an unstable self-exciting dynamo is considerably advantageous also for other uses where there is involved difficult greater regulation work.

4. *Reversal of current*

The performing of the generator without commutating poles occurs only in case of small output, and even then only in case of low voltages at the slot bridges of the commutator, and therefore in case of small low total voltage of the machine. In every other case there are commutating poles needed for obtaining a unobjectionable reversal of current.

Differing from the usual disposition of the commutating poles of commutator machines, the poles 24 of the intermediate-rotor type generator as shown in Figs. 1 and 12 do not act upon the armature A generating the electromotoric force $E_A$, but upon an auxiliary armature 25, somewhat forming a lengthening of A, having also the winding 1 in common with A.

The reversing field $\Phi_W$ varying according to the monetary existing frequency $f$, has to be combined of two components $\Phi_{W_1}$ and $\Phi_{W_2}$, in order to effect an unobjectionable reversal of current. $\Phi_{W_1}$ has the object to produce the reversing voltage $e_{W_1}$ which has to absorb the reactance voltage in the commutating coil tending to retard the commutation of current and being caused by the leakage of the armature winding. Therefore $\Phi_{W_1}$ has to be proportional to the brush current, and phase-coinciding with it, as required in every commutator machine with commutating poles. $\Phi_{W_2}$ produces the commutating voltage $e_{W_2}$ in the commutating coils which is to compensate the voltage $e_\Phi$ induced in the said coils by the field of the intermediate rotor. If $L_A$ is the ideal (effective) length of the armature A, $L_H$ the ideal length of the auxiliary armature 25, B the local induction of the useful field $\Phi$ acting on the commutating coils, and $B_{W_2}$ the instantaneous value of the induction of the commutating field $\Phi_{W_2}$ acting on the same coils, the electromotoric force (instantaneous value) produced in the commutating coils by the field is obtained by the equation:

$$e_\Phi = k.B.L_A.(n_A - n_Z) \qquad (8)$$

considering, that the relative number of revolutions of the field $\Phi$ with respect to armature is $(n_A - n_Z)$ and $\Phi_{W_2}$ is a locally stationary field, showing the relative number of revolutions $n_A$ with regard to the armature. The electromotoric force induced by the field $\Phi_{W_2}$ and destinated to compensate $e_\Phi$ has the momentary value $$e_{W_2} = k.B_{W_2}.L_H.n_A \qquad (9)$$

In Equation 9 only the electromotoric force of motion induced by $\Phi_{W_2}$ is considered. The electromotoric forces induced by way of transformation by all the commutating fields interlinked with the commutating coils and therefore being commutating fields, are generally, even with high values of frequency, of such an inferior effect, that they are to be neglected in the present explanations which have to demonstrate the principle only. By equalizing the sum of the Equations 8 and 9 with zero, we obtain:

$$B_{W_2} = -\frac{L_A}{L_H} \cdot B \cdot \left(1 - \frac{n_Z}{n_A}\right) \qquad (10)$$

Equation 10 is valid for all momentary values, therefore for those of the inductions too. The maximum value of B (with regard to the intermediate rotor a local maximum value, and with regard to a commutating coil a temporal one!) shows above the frequency $f$ or the number of revolutions $n_Z$ the same course as the total electromotoric force E of the generator with constant number of revolutions which results also from Equation 4, as, the higher harmonics disregarded, the maximum value of the induction E is proportional to the field $\Phi$ (Figs. 5 and 11). By multiplication with the expression in brackets of Equation 10—$n_Z/n_A$ may be replaced by $f/f_A$—the course of the maximum value—

$$B_{W_2} \cdot L_Z/L_A$$

above the frequency as illustrated by Fig. 11 results from the B-over-$f$-curve.

The reversing field $\Phi_{W_2}$ is produced by an additional winding 4 on the compoles 4 (Fig. 1).

The field $\Phi_{W_2}$ induces a voltage in the additional commutating pole winding producing the said field, which voltage is proportional to the product of the temporal maximum value of $B_{W_2}$ according to Equation 10 times the frequency $f$. By multiplication of Equation 10 times $f$ results after introduction of Equation 4 the following relation of the voltage of self-induction:

$$E_{W2}=k_W \cdot E \cdot \left(1-\frac{n_Z}{n_A}\right) \cdot \frac{n_Z}{n_A} \qquad (11)$$

($k_W$ . . . a constant). By combination of Equations 6 and 7 with Equation 11 results:

$$E_{W2}=k_W \cdot B_A \cdot \frac{n_Z}{n_A} \qquad (12)$$

and $$E_{W2}=k_W \cdot E_S \cdot \left(1-\frac{n_Z}{n_A}\right) \qquad (13)$$

the following relation resulting from Equations 2 and 5 is to be considered:

$$\frac{n_Z}{n_A}=\frac{f}{f_A} \qquad (14)$$

From Equations 12 and 7 results the relation:

$$\frac{E_{W2}}{E_A}=k_W \cdot \frac{E_S}{E} \qquad (15)$$

The ohmic voltage drop in the circuit of the commutating pole windings 4 producing $\Phi_{W_2}$ is of no importance compared with the self-induction voltage $E_{W_2}$, except in case of very low values of frequency, and therefore it may be neglected. In return in case of very small values of frequencies the occasionally occurring deviations of the induction $B_{W_2}$ with regard to the desired values and effected by the ohmic voltage drop are insignificant inasmuch as the voltage $e\Phi$ in the commutating coils according to Equation 8, which voltage is to be compensated, is so inferior in consequence of the small value of B, that the remainders of the said voltage which are not compensated by $e_{W_2}$ are overcome without difficulty by the commutating power of the commutator brushes. Therefore an electromotoric force equal to the self-induction voltage $E_{W_2}$ is sufficient to produce $\Phi_{W_2}$. It is also possible to supply the said electromotoric force $E_{W_2}$ by an exciter. The exciter 85 (Fig. 17) has a D. C.-excited rotor 86, which is driven from the intermediate rotor ZL. Its stator winding 88 produces the voltage $E_{W_2}$, which is supplied through the transformer 50 (Fig. 12) to the additional compole windings 4. The rotor 86 is excited through sliprings from a battery 90. A rheostat 89 for regulating the voltage $E_{W_2}$ is provided in the exciting circuit, which rheostat is controllable by a device 53 (Fig. 12) for controlling the voltage $E_{W_2}$, e. g., in accordance to Figs. 15 or 16. The best way however is to produce it by a continuously-variable-ratio transformer 47 (Fig. 12) the primary winding 48 of which is connected to the total voltage or to the voltage of armature or stator, its ratio is controlled by the position of its movable part according to the Equations 11 or 12 or 13. There are also a considerable number of continuously-variable-ratio transformer networks coming into question and resulting by combination of the Equations 11, 12 and 13, (multiple fed transformers). The controlling of the ratio of the continuously-variable-ratio transformer may be effected either by a device producing the quotient $n_Z/n_A$ or $f/f_A$ (such controlling devices can be accomplished in various ways acting mechanically or electromagnetically), or by means which control maintenance of the proportion according to Equation 15. A mechanical device of that type consists according to Fig. 15 of two spring-less centrifugal regulators 69 and 70, which operate in mutually opposing senses on a common regulator sleeve 71, the regulator 69, driven by the prolonged hub 12 of the intermediate rotor, being axially displaceably coupled with the sleeve 71 by means of an intermediate member 72, whereas the regulator 70, driven by the armature shaft 14, attacks directly on the sleeve 71. An adjusting gear 73, whose position depends on the speed ratio $$\frac{n_A}{n_Z}$$

adjusts the ratio of the continuously-variable-ratio transformer 47 by means of a suitable transmission device.

A control device of the type mentioned in the second place (Fig. 16) comprises two cross-coil relays, whose portions 74 and 75, developed like electrical quotient (cross-coil) measuring instruments, deflect with their movable parts a rotatable contact arm 76 or a contact disc 77 having the appertaining countercontacts 78 and 79. The position of the freely rotatable parts of the portion 74 depends on the ratio $$\frac{E_{W2}}{E_A}$$

that of the portion 75 on the coefficient $$\frac{E_S}{E}$$

The contact arm 78 is electrically connected with the circuit of a reversible auxiliary motor 81 fed by the battery 80, which motor has exciter windings 82, 83 for the two senses of rotation, which windings are connected to the contacts 78 and 79, respectively, of the contact disc 77. The auxiliary motor 81 adjusts through a self-arresting worm gearing 84 the movable part of the continuously-variable-ratio transformer 47 when the movable parts of 74 and 75 alter their relative position, i. e., when the proportion of Equation 15 is altered. If necessary, also hitherto neglected ohmic voltage drop in the circuit producing $\Phi_{W_2}$ may be at least approximately taken into account by adequate voltage components delivered by the continuously-variable-ratio transformer.

From those connections in which the continuously-variable-ratio transformer 47 (Fig. 12) is not or not exclusively fed by the total voltage of the generator, but exclusively or additionally by the armature or stator voltage, primary currents or current components result, flowing through the winding of armature or stator only, and their total fluxes being not compensated they participate in producing the field $\Phi$. Their effective components effect also additional rotational moments to the intermediate rotor. Such "auxiliary currents" have been mentioned before already (column —, line —; column —, line —).

The commutating field component $\Phi_{W1}$ is produced by the series windings 3 (Figs. 1 and 12) blown through by the brush currents, as uaual in every commutating pole machine. $\Phi_{W1}$ induces a voltage in the windings 4 used for exciting $\Phi_{W2}$:

$$E_{W1}=c.B_{W1}.f=c_1.I.f \qquad (16)$$

wherein $c$ and $c_1$ mean constants and $B_{W_1}$ is the temporal maximum value of the induction of the field $\Phi_{W1}$, and I the corresponding brush current. Therefore an equal electromotoric force opposite to the said voltage must be produced in the exciting circuit of $\Phi_{W_2}$. If the iron saturations of the commutation field are of a high degree, that electromotoric force enforces the temporally sinusoidal diagram of $\Phi_{W_1}$ by generating corresponding higher harmonic additional currents, the series-exciting produced by the brush current would not be able by itself to maintain that course.

Thus in the commutating pole additional windings (Fig. 12) there is needed a total electromotoric force, which is equal to the sum of the vectors of the electromotoric force $E_{W_2}$ being independent from the load, and electromotoric force $E_{W_1}$ depending on the load and proportional to the brush current. The best way is to generate the electromotoric force $E_{W_1}$ in an additional transformer 50 (Fig. 12), whose winding 51 is blown through by the brush currents. By such an additional series connected transformer 50 having the windings 51 and 52, the deviations of the generator terminal voltages U or $U_A$ or $U_S$ being connected to the primary circuit of the continuously-variable-ratio transformer 47, from the electromotive forces E, or $E_A$, or $E_S$, theoretically required for the supply (according to Equations 11, 12 or 13), may be also compensated, as far as it appears necessary in the practical use. These deviations are equal to the drop of voltage in the generator and therefore proportional to the brush currents.

I claim as my invention:

1. An electric commutator machine comprising, in combination, a rotatable armature having a commutator thereon, a stator surrounding and radially spaced from said armature, an intermediate rotor arranged in the annular space between said armature and said stator and having an exciting winding and being rotatable independently of said armature, the stator winding being series connected through said commutator in opposition to the armature winding and arranged substantially as the electromagnetical reflection of the latter, and means for controlling the speed of said intermediate rotor.

2. An electric commutator machine as set forth in claim 1, in which the stator winding is an evenly distributed slot winding for setting up a magnetic flux compensating the magnetic flux set up by the armature winding, and means operable to vary the rotational momentum of the intermediate rotor applied by said armature.

3. An electric commutator machine as set forth in claim 1, for use as a generator, comprising a synchronous motor for driving the intermediate rotor, said synchronous motor being fed from the generator, and means operable to vary the rotational momentum of the intermediate rotor applied by said armature.

4. An electric commutator machine as set forth in claim 3, in which the synchronous motor has two D. C.-fed exciting systems and which comprises means for controlling the current in at least one of said systems.

5. An electric commutator machine as set forth in claim 1, for use as a generator, comprising a synchronous motor for driving the intermediate rotor and being fed from the generator, a rotation-speed-controlled regulating device operatively connected with said means for controlling the exciting current for said synchronous motor and with said synchronous motor, said regulating device being adapted to adjust said control means when the rotation speed deviates from a set value, and means operable to vary the rotational momentum of the intermediate rotor applied by said armature.

6. An electric commutator machine as set forth in claim 1, for use as a generator, comprising a synchronous motor for driving the intermediate rotor and fed from the generator, a centrifugal governor operatively connected with said means for controlling the exciting current for said synchronous motor and with said synchronous motor, said governor being adapted to adjust said control means when the rotation speed deviates from a set value, and means operable to vary the rotational momentum of the intermediate rotor applied by said armature.

7. An electric commutator machine as set forth in claim 6, in which said means for controlling the exciting current for said synchronous motor consist of carbon rheostats, which are operatively connected with said centrifugal governor in that the pressure exercised upon them is subject to the centrifugal force exercised by the governor.

8. An electric commutator machine as set forth in claim 1, comprising an extension of the armature shaft, an auxiliary armature fixed to said extension, and commutating poles surrounding said auxiliary armature.

9. An electric commutator machine as set forth in claim 1, in which said intermediate rotor consists of a hollow cylindrical body composed of iron webs, wedges of non-magnetic material inserted between said webs, and shrunk-on caps at its ends, and carries end connections for its exciting winding, said end connections being supported by said caps against centrifugal force.

10. An electric commutator machine as set forth in claim 1, in which the intermediate rotor has a D. C.-fed exciting winding which is evenly distributed over approximately two thirds of the pole pitch, and means operable to vary the rotational momentum of the intermediate rotor applied by said armature.

11. An electric commutator machine as set forth in claim 1, wherein the intermediate rotor has a polyphase exciting winding fed by alternating current.

12. An electric commutator machine as set forth in claim 1, comprising a hub for said intermediate rotor, said hub having an extension, an armature hub fixed to the armature shaft and having a recess in one end face, the extension of the intermediate rotor hub extending into the recess of the armature hub.

13. An electric commutator machine as set forth in claim 1, comprising an exciter for the exciting winding of said intermediate rotor.

14. An electric commutator machine comprising, in combination, a rotatable armature having a commutator thereon, a stator surrounding and radially spaced from said armature, an intermediate rotor arranged in the annular space between said armature and said stator and having an exciting winding and being rotatable independently of said armature, the stator winding being series connected through said commutator in opposition to the armature winding and arranged substantially as the electromagnetical reflection of the latter, and means for controlling the speed of said intermediate rotor, said machine being for use as a generator and including a synchronous motor for driving the intermediate rotor, said synchronous motor being of the over-excitable type and being fed from the generator, and means operable to vary the rotational momentum of the intermediate rotor applied by said synchronous motor.

15. An electric commutator machine comprising, in combination, a rotatable armature having a commutator thereon, a stator surrounding and radially spaced from said armature, an intermediate rotor arranged in the annular space between said armature and said stator and having an exciting winding and being rotatable independently of said armature, the stator winding being series connected through said commutator in opposition to the armature winding and arranged substantially as the electromagnetical reflection of the latter, and means for controlling the speed of said intermediate rotor, said machine being for use as a generator and including a synchronous motor for driving the intermediate rotor and being fed from the generator, a rotational-speed-controlled regulating device operatively connected to said means for controlling the exciting current for said synchronous motor and to said synchronous motor, said regulating device being operable to adjust said control means when the rotational speed deviates from a predetermined value, and means operable to vary the rotational momentum applied by said synchronous motor to said intermediate motor and having means for controlling the setting of said regulating device operatively connected with machine parts subject to variations of machine operating conditions.

16. An electric commutator machine as set forth in claim 15, comprising a prime mover of the type whose speed of rotation varies in the inverse sense as its load, said prime mover being adapted to drive the armature as well as said rotation-speed-controlled regulating device.

17. An electric commutator machine as set forth in claim 15, comprising a prime mover of the type whose speed of rotation varies in the inverse sense as its load, means for controlling the fuel supply to said prime mover, means for controlling the setting of said rotation-speed-controlled regulating device, said setting control means being operatively connected with said fuel supply control means, said prime mover being adapted to drive the armature as well as said rotation-speed-controlled regulating device.

18. An electric commutator machine as set forth in claim 15, in which said rotation-speed-controlled regulating device is adapted to be driven with the rotation speed of the intermediate rotor.

19. An electric commutator machine as set forth in claim 15, in which said rotation-speed-controlled regulating device consists of a D. C. dynamo of the type which is unstably self-exciting when operating at a desired rotation speed, and which comprises a separate D. C. supply, the exciting windings of said synchronous motor for driving the intermediate rotor being fed both by said dynamo and said separate D. C. supply.

20. An electric commutator machine comprising, in combination, a rotatable armature having a commutator thereon, a stator surrounding and radially spaced from said armature, an intermediate rotor arranged in the annular space between said armature and said stator and having an exciting winding and being rotatable independently of said armature, the stator winding being series connected through said commutator in opposition to the armature winding and arranged substantially as the electromagnetical reflection of the latter, and means for controlling the speed of said intermediate rotor and including commutating poles, a set of windings, mounted on said commutating poles, and being interconnected for brush current feeding, a second set of windings mounted on said commutating poles and being interconnected to an electric source of supply.

21. An electric commutator machine as set forth in claim 20, comprising a continuously-variable-ratio transformer for supplying said additional commutator pole windings, the primary winding of said transformer being adapted to be fed by at least one of the voltages set up in the armature and stator windings of the machine.

22. An electric commutator machine as set forth in claim 20, comprising a continuously-variable-ratio transformer for supplying said additional commutating pole windings, means for controlling the ratio of said transformer, said means being dependent in operation on the ratio of the rotation speeds of the intermediate rotor and the armature, the primary winding of said transformer being adapted to be fed by at least one of the voltages set up in the armature and stator windings of the machine.

23. An electric commutator machine as set forth in claim 20, comprising a continuously-variable-ratio transformer for supplying said additional commutating pole windings, the primary winding of said transformer being adapted to be fed by at least one of the voltages set up in the armature and stator windings of the machine, and brush-current fed additional transformer means, the secondary windings of which are series-connected with the secondary windings of said continuously-variable-ratio transformer in the supply circuit for said additional commutating pole windings.

24. An electric commutator machine as set forth in claim 20, comprising a separate exciter for the additional commutating pole windings.

HEINZ ROSENBERG.

REFERENCES CITED

The following references are of record in the file of this patent:

UNITED STATES PATENTS

| Number | Name | Date |
|---|---|---|
| 1,675,960 | Schon et al. | July 3, 1928 |
| 1,773,842 | Neuland | Aug. 26, 1930 |